J. ZAHLER.
AUTOMOBILE TIRE AND RIM LOCK.
APPLICATION FILED DEC. 14, 1920.

1,419,796.

Patented June 13, 1922.
2 SHEETS—SHEET 1.

Inventor
J. Zahler
By
Attorney

J. ZAHLER.
AUTOMOBILE TIRE AND RIM LOCK.
APPLICATION FILED DEC. 14, 1920.
1,419,796.
Patented June 13, 1922.
2 SHEETS—SHEET 2.
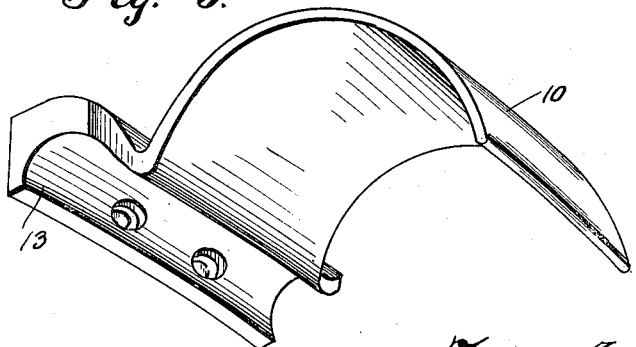
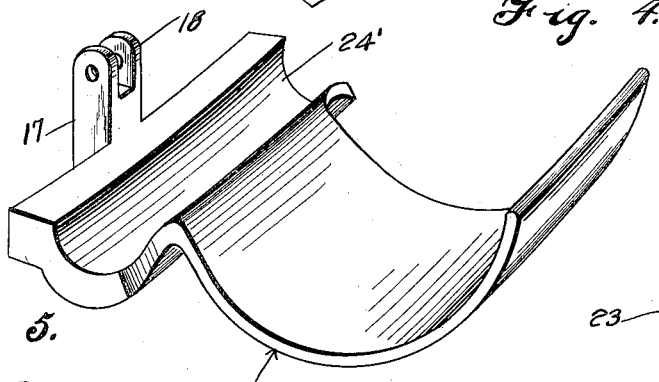
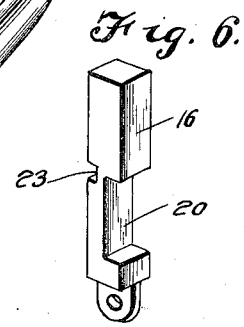
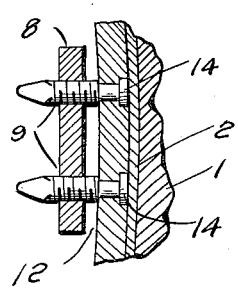
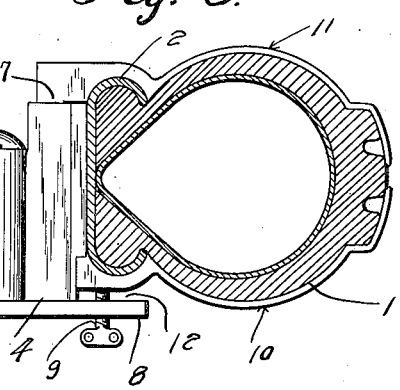
Inventor
J. Zahler

UNITED STATES PATENT OFFICE.

JOSEPH ZAHLER, OF HUDSON, WISCONSIN.

AUTOMOBILE TIRE AND RIM LOCK.

1,419,796. Specification of Letters Patent. Patented June 13, 1922.

Application filed December 14, 1920. Serial No. 430,674.

*To all whom it may concern:*

Be it known that I, JOSEPH ZAHLER, a citizen of the United States, residing at Hudson, in the county of St. Croix and State of Wisconsin, have invented certain new and useful Improvements in Automobile Tire and Rim Locks; and I do hereby declare the following to be a full, clear, and exact description of the invention, such as will enable others skilled in the art to which it appertains to make and use the same.

This invention relates to new and useful improvements in automobile tire and rim locks, and has for its primary object the provision of means which will prevent theft of a tire and its rim when carried as an extra on an automobile, and also may be employed for supporting the tire and rim on the automobile in lieu of the ordinary tire carrier, or the device may be employed in conjunction with a tire carrier.

Another object of this invention is the provision of means which will permit easy and quick removal of the tire and rim when desired and when supporting the latter will prevent an unauthorized person from removing the same.

A further object of this invention is the provision of an automobile tire and rim lock of the above stated character which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1:
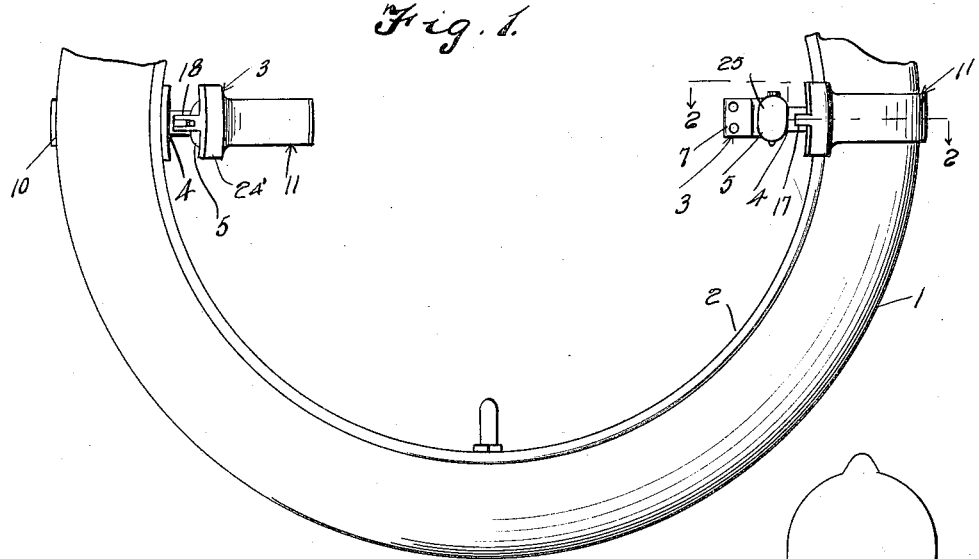
Figure 2:
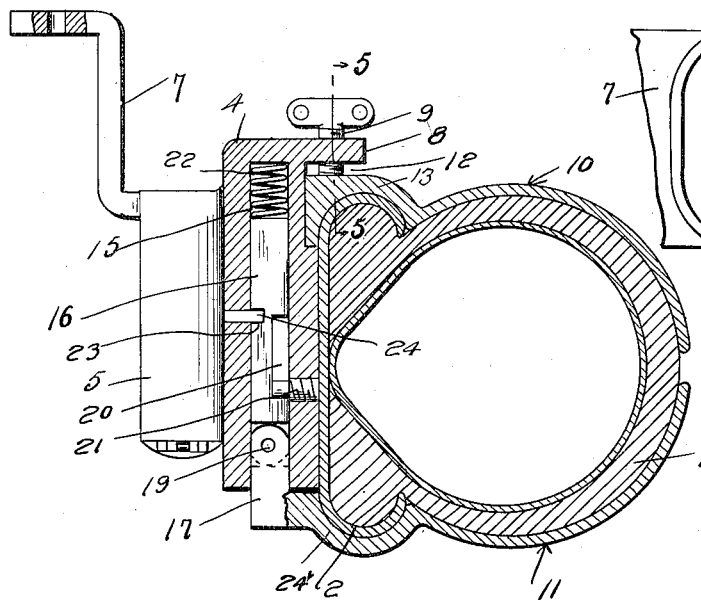
Figure 7:
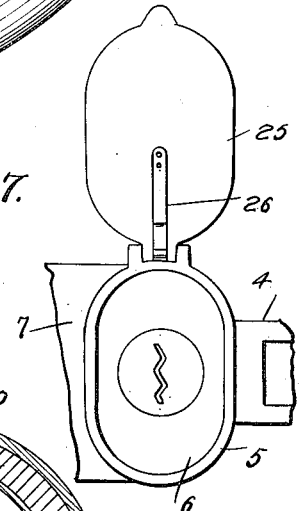

Figure 1 is a fragmentary side elevation illustrating an automobile tire and its rim with locks applied thereto, and constructed in accordance with my invention and one of said locks being shown in an open position, Figure 2 is a sectional view taken on the line 2—2 of Figure 1, Figure 3 is a perspective view illustrating one of the tire clamps or irons, Figure 4 is a similar view illustrating the other tire clamp or iron, Figure 5 is a fragmentary sectional view illustrating the means of connecting adjusting bolts to the tire clamp or iron shown in Figure 3, Figure 6 is a perspective view illustrating a stem, Figure 7 is a fragmentary elevational view illustrating the lock casing and its cover, Figure 8 is a view illustrating a slightly modified form of my invention.

Referring in detail to the drawings, the numeral 1 indicates an ordinary tire mounted upon a rim 2 and which is adapted to be locked to an automobile by any number of locks 3 which may form part of an ordinary tire holder not shown or may be attached directly to an automobile and the locks 3 are identical in construction with each other, and reference to one in detail is thought sufficient for all.

The lock 3 consists of a base 4 which has formed integrally therewith a lock casing 5 in which is secured in any desired manner a lock 6 of a conventional construction actuated through the medium of a key. The lock casing 5 has formed integrally therewith, a bracket 7 adapted to be either secured to a tire holder or directly to an automobile by non-removable fasteners. Upon the rear edge of the base 4 is formed a retaining flange 8 provided with screw threaded openings to receive set bolts 9 that have swivel connection with a tire clamp or iron 10. The tire clamp or iron 10 cooperates with a tire clamp or iron 11 in receiving and supporting the tire 1, as clearly shown in Figure 2. The tire clamps or irons 10 and 11 may be of desired shape as for instance as shown in Figures 2 and 8. In Figure 2 the clamps or irons are shown as being shaped to conform to a tire having a smooth tread while the irons or clamps in Figure 8 are shaped to conform to the contour of a non-skid tread of a tire. The base 4 is adapted to have the rim 2 supporting the tire rest thereon and is provided with a cut-out portion 12 adjacent the retaining flange 8 for the reception of a base 13 formed on the tire clamp or iron 10. The base 13 is shaped to conform to the rim 2 and one of its retaining flanges and seat within the cutout portion 12 partially underlying the rim 2. The base 13 is provided with countersunk openings to receive the heads 14 formed on the set bolts 9 whereby said set bolts are swivelly connected to the tire iron or clamp 10 and will not interfere with the base 13 thereof conforming to the curvature of the rim and one of its bead flanges.

The base 4 is provided with a chamber 15 in which is slidably mounted a stem 16 and said chamber opens outwardly on one side of the base 4 to receive an arm 17 formed integrally with the tire clamp or iron 11. One end of the stem 16 is reduced and apertured and disposed between spaced ears 18 formed on the arm 17.

The ears are pivotally connected by rivets or bolts 19. The hinged connection between the stem 16 and the arm 17 established by the rivet 19 and said ears are confined within the chamber 15 when the device is in tire supporting and holding position preventing the tire clamp or iron 11 from being swung away from the tire. The stem 16 is provided with a slot 20 engaged by a stop 21 carried by the base 4, for limiting the outward movement of the stem 16 and which is urged outwardly of the chamber by means of expansion spring 22. The slot 20 in the stem when freed from a locked position will permit said stem to pass sufficiently outwardly of the chamber 15 to expose the hinge between itself and the arm 17 so that the tire clamp or iron may be swung away from the tire 1. The stem 16 is provided with a notch 23 adapted to be engaged by the locking bolt 24 of the lock 6 to retain the stem in a retracted position and for holding the hinged connection between the stem and the arm 17 within the casing and consequently holding the tire clamp or iron 11 in engagement with the tire.

The tire clamp or iron 11 is provided with a base 24' shaped to conform to the other bead flange of the rim 2 and has formed integrally therewith the arms 17.

The lock casing 5 is equipped with a hinged cover 25 normally urged into a closing position by means of a spring 26 and is adapted to conceal the lock 6 and thereby exclude dust, dirt and other foreign matter from the lock.

The stop 21 is in the form of a screw and is threaded into an opening formed in the base 4 and which communicates with the chamber and extends through the outer face of said base so that the screw 21 can be removed and replaced when the tire and rim have been removed from the device. With the tire and rim positioned upon the device it is impossible to remove the screw 21 until after the tire clamp or iron 11 has been freed and the rim removed.

In operation, the tire and rim are positioned upon the base 4 when the tire clamp or iron 11 is in an open position and after the proper positioning of the tire and rim upon the base 4, the tire clamp or iron 11 is swung into engagement with the tire and the same is moved transversely of the device so as to cause the arm 17 to enter the chamber and the lock bolt 24 to engage in the notch 23 in the stem 16. After the tire clamp or iron 11 has been locked in position, the set bolts 9 are then adjusted so as to bring the tire iron or clamp 10 into tight engagement with the tire 1. In order to lock or unlock the device it will be always necessary to first adjust the set bolts 9 so as to permit the rim and tire to have a slight transverse movement with relation to the base 4. The adjustment of the tire clamp or iron 10 is limited away from the tire by the retaining flange 8 and the adjustment allowed to the tire clamp or iron 10 is not sufficient to permit the rim 2 to become disengaged from the holder or permit the rim 2 to be moved out or beyond the base 13 of said tire clamp or iron.

While I have shown and described the preferred embodiment of my invention, it will be understood that minor changes in construction, combination and arrangement of parts may be made without departing from the spirit and scope of the invention as claimed.

Having thus described my invention, what I claim is:

A tire and rim lock comprising a support having a transverse chamber opening outwardly through one side thereof and having its other end closed, a flange formed in the other side of the support and the latter having a recess, a tire and rim engaging element seated in said recess, means adjustable on said flange to force said element against one end wall of said recess, a stem in said chamber and having a notch and a recess, a spring between the stem and the closed end of the chamber, a projection carried by the support and fitting in said second recess, a second rim and tire engaging element having an extended portion into the stem, and a locking means carried by the support to engage the notch to retain the stem and a part of the extended portion in the chamber against the action of the spring.

In testimony whereof I affix my signature in presence of two witnesses.

JOSEPH ZAHLER.

Witnesses:
 N. O. VARNUM,
 GEO. J. ZAHLER.